United States Patent
Lee (10) Patent No.: US 11,226,068 B2
(45) Date of Patent: Jan. 18, 2022

(54) HIGH-PRESSURE TANK AND MANUFACTURING METHOD OF HIGH-PRESSURE TANK

(71) Applicant: TOYOTA JIDOSHA KABUSHIKI KAISHA, Toyota (JP)

(72) Inventor: Sangkun Lee, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 66 days.

(21) Appl. No.: 16/555,038

(22) Filed: Aug. 29, 2019

(65) Prior Publication Data

US 2020/0116304 A1 Apr. 16, 2020

(30) Foreign Application Priority Data

Oct. 16, 2018 (JP) .............................. JP2018-194876

(51) Int. Cl.
*F17C 1/00* (2006.01)

(52) U.S. Cl.
CPC ........ F17C 1/00 (2013.01); *F17C 2201/0114* (2013.01); *F17C 2203/0604* (2013.01); *F17C 2203/067* (2013.01); *F17C 2203/0621* (2013.01); *F17C 2209/2154* (2013.01); *F17C 2209/232* (2013.01); *F17C 2221/012* (2013.01); *F17C 2221/014* (2013.01); *F17C 2221/017* (2013.01); *F17C 2270/0168* (2013.01); *F17C 2270/0184* (2013.01)

(58) Field of Classification Search
CPC ...... F17C 1/06; F17C 1/00; F17C 2203/0663; F17C 2203/0665; F17C 2203/0668; F17C 2203/067; F17C 2203/0624; F17C 2203/0621; F17C 2203/0604; F17C 2203/0602; F17C 2201/0114; F17C 2209/2154; F17C 2221/012; F17C 2221/014; F17C 2221/017; F17C 2270/0168; F17C 2270/0184
See application file for complete search history.

(56) References Cited

U.S. PATENT DOCUMENTS 4,105,819 A * 8/1978 Kotcharian ............. B32B 15/08
220/901
4,366,917 A * 1/1983 Kotcharian ............. B32B 15/08
220/560.06

(Continued)

FOREIGN PATENT DOCUMENTS

CN 103347685 A 10/2013
CN 106808743 A 6/2017
(Continued)

*Primary Examiner* — Don M Anderson
(74) *Attorney, Agent, or Firm* — Dickinson Wright, PLLC (57) ABSTRACT

Provided is a high-pressure tank including: a helical layer containing first fibers that are wound in a helical pattern and a first resin that fixes the first fibers; a hoop layer located outward of the helical layer in the high-pressure tank and containing second fibers that are wound in a hoop pattern and a second resin that fixes the second fibers; and an intermediate layer located between the helical layer and the hoop layer and containing third fibers that are thinner than at least either the first fibers or the second fibers and a third resin that fixes the third fibers, the first fibers of the helical layer, and the second fibers of the hoop layer.

7 Claims, 7 Drawing Sheets

(56) References Cited

U.S. PATENT DOCUMENTS

| | | | | |
|---|---|---|---|---|
| 5,385,263 | A * | 1/1995 | Kirk | F17C 1/16 |
| | | | | 220/589 |
| 6,090,465 | A * | 7/2000 | Steele | B60K 15/03006 |
| | | | | 428/102 |
| 2017/0151752 | A1 | 6/2017 | Nakamura et al. | |
| 2018/0163925 | A1 * | 6/2018 | Inoh | B32B 5/26 |
| 2018/0180222 | A1 | 6/2018 | Ueda et al. | |
| 2018/0340655 | A1 * | 11/2018 | Lee | F17C 13/002 |

FOREIGN PATENT DOCUMENTS

| | | | |
|---|---|---|---|
| JP | 2013536108 | A | 9/2013 |
| JP | 2018100768 | A | 6/2018 |
| WO | 2012007116 | A2 | 1/2012 |
| WO | 2012/104690 | A1 | 8/2012 |

\* cited by examiner

HIGH-PRESSURE TANK AND MANUFACTURING METHOD OF HIGH-PRESSURE TANK

INCORPORATION BY REFERENCE

The disclosure of Japanese Patent Application No. 2018-194876 filed on Oct. 16, 2018 including the specification, drawings and abstract is incorporated herein by reference in its entirety.

BACKGROUND

1. Technical Field

The present disclosure relates to a high-pressure tank and a manufacturing method of a high-pressure tank.

2. Description of Related Art

There is a conventional high-pressure tank that is filled with compressed hydrogen (Japanese Patent Application Publication No. 2018-100768; hereinafter referred to as JP 2018-100768 A). The high-pressure tank of JP 2018-100768 A includes a liner, a reinforcing layer, a protective layer, and plugs. The liner has a property of blocking hydrogen etc. filling a space inside the liner from leaking out (so-called gas barrier property). The reinforcing layer is formed so as to cover the entire external surface of the liner and part of each plug. The reinforcing layer is made of a carbon fiber-reinforced plastic (CFRP) and has pressure resistance. The protective layer is formed on the reinforcing layer. The protective layer is made of a glass fiber-reinforced plastic (GFRP) and has higher impact resistance than the reinforcing layer.

SUMMARY

The inventor of the present application has found that repeated gas filling and emptying of the high-pressure tank described in JP 2018-100768 A in a high-temperature, high-humidity environment results in peeling off and turning up of part of the protective layer. The inventor of the present application has further found that such peeling off occurs between a layer of the protective layer in which glass fibers are wound in a helical pattern and a layer thereof in which glass fibers are wound in a hoop pattern.

The present disclosure can be realized in the following form of implementation.

A high-pressure tank is provided as one form of implementation of the present disclosure. This high-pressure tank includes: a helical layer containing first fibers that are wound in a helical pattern and a first resin that fixes the first fibers; a hoop layer located outward of the helical layer in the high-pressure tank and containing second fibers that are wound in a hoop pattern and a second resin that fixes the second fibers; and an intermediate layer located between the helical layer and the hoop layer and containing third fibers that are thinner than at least either the first fibers or the second fibers and a third resin that fixes the third fibers, the first fibers of the helical layer, and the second fibers of the hoop layer.

This aspect allows the clearance between the first fibers forming the outermost layer of the helical layer and the second fibers forming the innermost layer of the hoop layer to be reduced by the third fibers that are thinner than at least either the first fibers or the second fibers. Thus, the clearance between the first fibers forming the outermost layer of the helical layer and the second fibers forming the innermost layer of the hoop layer can be filled to thereby reduce the formation of cracks in the third resin that fixes these first fibers and second fibers. As a result, the likelihood of the hoop layer peeling off from the helical layer can be lessened.

In the high-pressure tank of the above form of implementation, the first fibers may be impregnated with the first resin, and the first resin may fix different fiber portions of the first fibers to each other; and the second fibers may be impregnated with the second resin, and the second resin may fix different fiber portions of the second fibers to each other.

In the high-pressure tank of the above form of implementation, the third fibers may be impregnated with the third resin, and may be arranged in a first direction and a second direction different from the first direction so as to form a sheet.

This aspect allows the clearance between the outermost layer of the helical layer in which the first fibers are arranged in various directions and the second fibers of the innermost layer of the hoop layer to be reduced by the third fibers, regardless of the direction of the first fibers in the outermost layer of the helical layer.

The high-pressure tank of the above form of implementation may further include a liner having a cylindrical part and domed parts arranged one at each end of the cylindrical part, with the helical layer being formed so as to surround the liner, and the third fibers may form a single piece of the sheet that is arranged so as to surround the cylindrical part.

This aspect allows the hoop layer and the helical layer to be evenly joined together around the cylindrical part.

A manufacturing method of a high-pressure tank is provided as another form of implementation of the present disclosure. This manufacturing method of a high-pressure tank includes: forming a helical layer by winding first fibers, impregnated with a first resin, in a helical pattern on a semi-finished product of the high-pressure tank; forming an intermediate layer by arranging third fibers, impregnated with a third resin, on the helical layer; and forming a hoop layer by winding second fibers, impregnated with a second resin, in a hoop pattern on the intermediate layer. The third fibers of the intermediate layer are thinner than at least either the first fibers of the helical layer or the second fibers of the hoop layer.

This aspect allows the clearance between the fibers forming the outermost layer of the helical layer and the fibers forming the innermost layer of the hoop layer to be reduced by the fibers that are thinner than at least either the fibers of the helical layer or the fibers of the hoop layer. Thus, the clearance between the fibers forming the outermost layer of the helical layer and the fibers forming the innermost layer of the hoop layer can be filled to thereby reduce the formation of cracks in the resin that fixes these fibers. As a result, the likelihood of the hoop layer peeling off from the helical layer can be lessened.

In the manufacturing method of the high-pressure tank of the above form of implementation, forming the intermediate layer may include arranging on the helical layer a sheet in which the third fibers of the intermediate layer are arranged in a first direction and a second direction different from the first direction.

This aspect allows the fibers of the intermediate layer to be arranged in a shorter time than an aspect of arranging the fibers of the intermediate layer by winding these fibers.

In the manufacturing method of the high-pressure tank of the above form of implementation, the semi-finished product may include a liner having a cylindrical part and domed parts arranged one at each end of the cylindrical part, and arranging the sheet on the helical layer may include arranging a single piece of the sheet so as to surround the cylindrical part.

This aspect allows the hoop layer and the helical layer to be evenly joined together around the cylindrical part. The present disclosure can also be realized in various forms other than the high-pressure tank. For example, the present disclosure can be realized in forms of implementation including a computer program that realizes a manufacturing method of a high-pressure tank, and a non-transitory recording medium that stores this computer program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Embodiment

A1. Configuration of High-Pressure Tank

Figure 1:
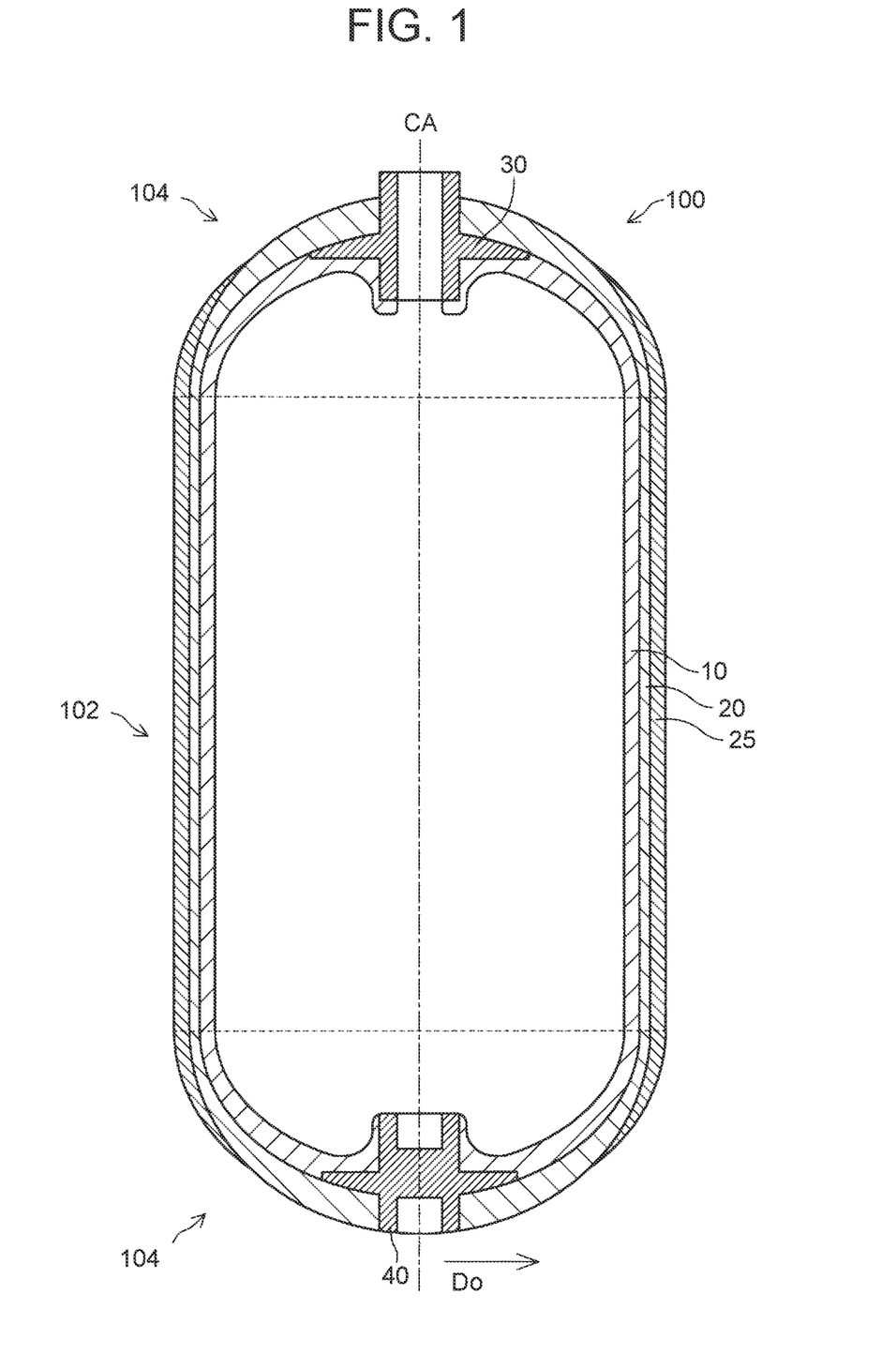
FIG. 1 is a sectional view showing a schematic configuration of a high-pressure tank as an embodiment of the technology disclosed herein.

FIG. 1 is a sectional view showing a schematic configuration of a high-pressure tank 100 as an embodiment of the technology disclosed herein. The high-pressure tank 100 is a gas tank that is a hollow container configured to be filled with compressed hydrogen. The high-pressure tank 100 is installed in a fuel cell vehicle to supply hydrogen to a fuel cell.

The high-pressure tank 100 has, as constituent parts, a cylindrical part 102 and a pair of domed parts 104. The cylindrical part 102 of the high-pressure tank 100 has a substantially cylindrical shape. Each domed part 104 of the high-pressure tank 100 has a substantially hemispherical shape with a radius equal to the radius of the cylindrical part 102. The domed parts 104 are arranged one at each end of the cylindrical part 102, with circular openings of the domed parts 104 facing the cylindrical part 102. In FIG. 1, borders between the cylindrical part 102 and the domed parts 104 are indicated by dashed lines. The terms "cylindrical part 102" and "domed part 104" are concepts of collectively referring to constituent elements, to be described below, of the high-pressure tank 100 by classifying these elements by the part of the high-pressure tank 100.

The high-pressure tank 100 includes a liner 10, a reinforcing layer 20, a protective layer 25, a plug 30, and a plug 40.

The liner 10 constitutes a layer on an innermost side in the high-pressure tank 100. The liner 10 is composed of a nylon resin. The liner 10 has a property of blocking hydrogen etc. filling a space inside the liner 10 from leaking out (so-called gas barrier property). Constituent parts of the liner 10 can also be divided into a part belonging to the cylindrical part 102 and parts belonging to the domed parts 104.

The plug 30 is arranged at a top of the part of the liner 10 that corresponds to one of the pair of domed parts 104. The "top" of the domed part 104 refers to a point of intersection between the domed part 104 and a central axis CA of the high-pressure tank 100. The plug 30 has a through-hole. The through-hole of the plug 30 connects an inside and an outside of the high-pressure tank 100 to each other. A pipe or a valve is mounted on the high-pressure tank 100 through the plug 30.

The plug 40 is arranged at a top of the part of the liner 10 that corresponds to the other one of the pair of domed parts 104. The plugs 30, 40 function also as mounting portions that are used to mount a tank main body onto a filament winding device to form the reinforcing layer 20 and the protective layer 25. In the present specification, the liner 10 with the plug 30 and the plug 40 mounted thereon is also referred to as a "tank main body." Constituent parts of the tank main body can also be divided into a part belonging to the cylindrical part 102 and parts belonging to the domed parts 104.

The reinforcing layer 20 is formed so as to cover an external surface of the tank main body. More specifically, the reinforcing layer 20 is formed so as to cover the entire external surface of the liner 10 and part of each of the plug 30 and the plug 40. The reinforcing layer 20 functions to reinforce the pressure resistance of the high-pressure tank 100. The reinforcing layer 20 is composed of a carbon fiber-reinforced plastic (CFRP) that is a composite material of an epoxy resin and carbon fibers. The diameter of the carbon fibers in the reinforcing layer 20 has a constant value within a range of 2 μm to 10 μm. Constituent parts of the reinforcing layer 20 can also be divided into a part belonging to the cylindrical part 102 and parts belonging to the domed parts 104.

The diameter of the carbon fibers in the reinforcing layer 20 is smaller than the diameter of glass fibers in the protective layer 25 to be described later. This configuration allows the carbon fibers to be arranged more densely in the reinforcing layer 20 than the glass fibers are in the protective layer 25. This aspect can enhance the pressure resistance of the high-pressure tank 100 compared with an aspect of the diameter of the fibers in the reinforcing layer 20 being equal to or larger than the diameter of the fibers in the protective layer 25.

The protective layer 25 is formed on the reinforcing layer 20. The protective layer 25 is composed of a glass fiber-reinforced plastic (GFRP) that is a composite material of a thermosetting resin and glass fibers. Thus, the protective layer 25 has higher impact resistance than the reinforcing layer 20.

Figure 2:
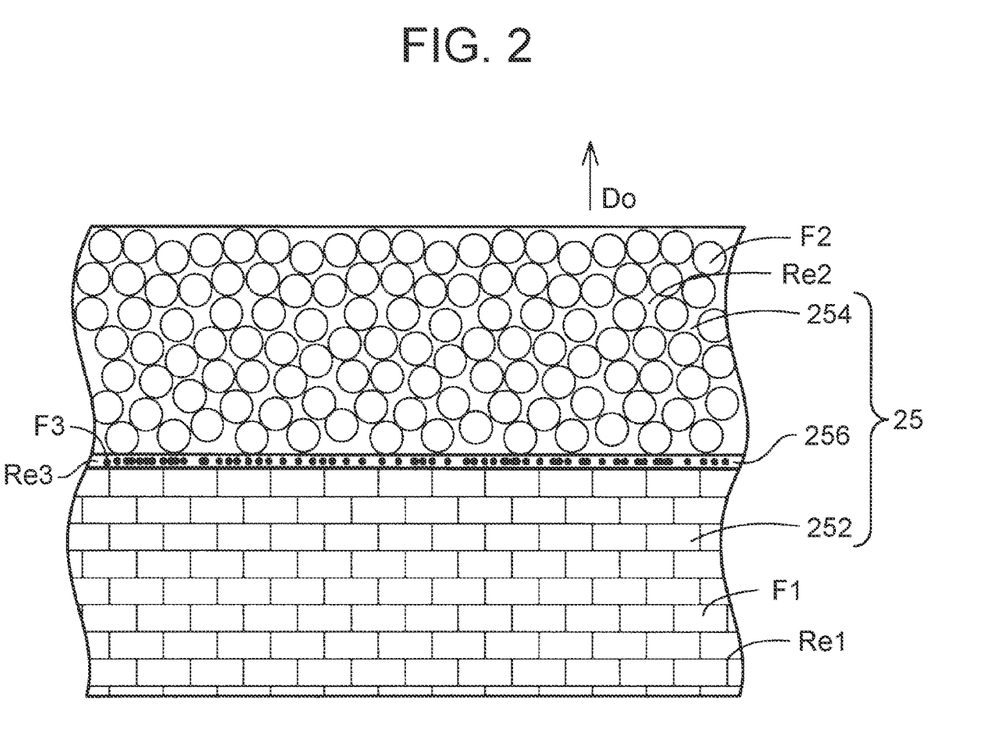
FIG. 2 is an enlarged view of a section of a protective layer 25 located at a cylindrical part 102.

FIG. 2 is an enlarged view of a section of the protective layer 25 located at the cylindrical part 102. In FIG. 1 and FIG. 2, a direction from the central axis CA of the high-pressure tank 100 toward an outer side is indicated by an arrow Do. FIG. 2 is a view for illustrating the gist of the technology and does not show the exact dimensions of each part.

The protective layer 25 has a helical layer 252, a hoop layer 254, and an intermediate layer 256. The helical layer 252, the hoop layer 254, and the intermediate layer 256 are each composed of a glass fiber-reinforced plastic. The helical layer 252, the hoop layer 254, and the intermediate layer 256 are different from one another at least either in the thickness of glass fibers used or in the direction of arrangement of the glass fibers. Thermosetting resins respectively contained in the helical layer 252, the hoop layer 254, and the intermediate layer 256 are the same epoxy resin.

The helical layer 252 is formed on the reinforcing layer 20. Specifically, the helical layer 252 is formed so as to surround the liner 10 under the reinforcing layer 20. The helical layer 252 contains glass fibers F1 that are wound in a helical pattern and an epoxy resin Re1 that fixes the glass fibers F1. Winding in a helical pattern, or helical winding, is a fiber winding method by which fibers are wound in a direction intersecting a plane perpendicular to the central axis CA of the tank main body. The diameter of the glass fibers F1 in the helical layer 252 has a constant value within a range of 10 μm to 20 μm. Constituent parts of the helical layer 252 can also be divided into a part belonging to the cylindrical part 102 and parts belonging to the domed parts 104.

The hoop layer 254 is located outward of the helical layer 252 in the high-pressure tank 100 (see the arrow Do). The hoop layer 254 is provided in the cylindrical part 102 of the high-pressure tank 100. The hoop layer 254 contains glass fibers F2 that are wound in a hoop pattern and an epoxy resin Re2 that fixes the glass fibers F2. Winding in a hoop pattern, or hoop winding, is a fiber winding method by which fibers are wound in a direction substantially parallel to a plane perpendicular to the central axis CA of the tank main body. The diameter of the glass fibers F2 in the hoop layer 254 has a constant value within a range of 10 μm to 20 μm. More specifically, the diameter of the glass fibers F2 in the hoop layer 254 is equal to the diameter of the glass fibers F1 in the helical layer 252. This configuration makes it possible to wind the glass fibers F1 of the helical layer 252 and the glass fibers F2 of the hoop layer 254 around the tank main body by using the same winding device and the same fibers.

The intermediate layer 256 is located between the helical layer 252 and the hoop layer 254. The intermediate layer 256 is provided in the cylindrical part 102 of the high-pressure tank 100. The intermediate layer 256 contains glass fibers F31, F32 that are arranged in two directions and an epoxy resin Re3 that fixes the glass fibers F31, F32.

The diameters of the glass fibers F31, F32 in the intermediate layer 256 have a constant value within a range of 2 μm to 10 μm. The diameters of the glass fibers F31, F32 in the intermediate layer 256 are smaller than the diameters of the glass fibers F1, F2 contained in the helical layer 252 and the hoop layer 254. The glass fibers F31, F32 in the intermediate layer 256 are arranged in a first direction D1 (see FIG. 5) and a second direction D2 (see FIG. 5) different from the first direction D1 so as to form a non-woven fabric sheet F3. The sheet F3 of the glass fibers F31, F32 in the intermediate layer 256 is a single piece of sheet that is arranged so as to surround the part of the liner 10 that corresponds to the cylindrical part 102 (see FIG. 1). The composition of the sheet F3 will be described in more detail later.

The epoxy resin Re3 in the intermediate layer 256 fixes the glass fibers F31, F32 in the intermediate layer 256, the glass fibers F1 contained in the outermost layer of the helical layer 252, and the glass fibers F2 contained in the innermost layer of the hoop layer 254. In FIG. 2, to help understand the technology, a border between the helical layer 252 and the intermediate layer 256 is indicated by a straight line and a border between the intermediate layer 256 and the hoop layer 254 is indicated by a straight line. In reality, however, the borders of the epoxy resins Re1, Re2, Re3 forming the layers are not always visually recognizable.

Figure 3:
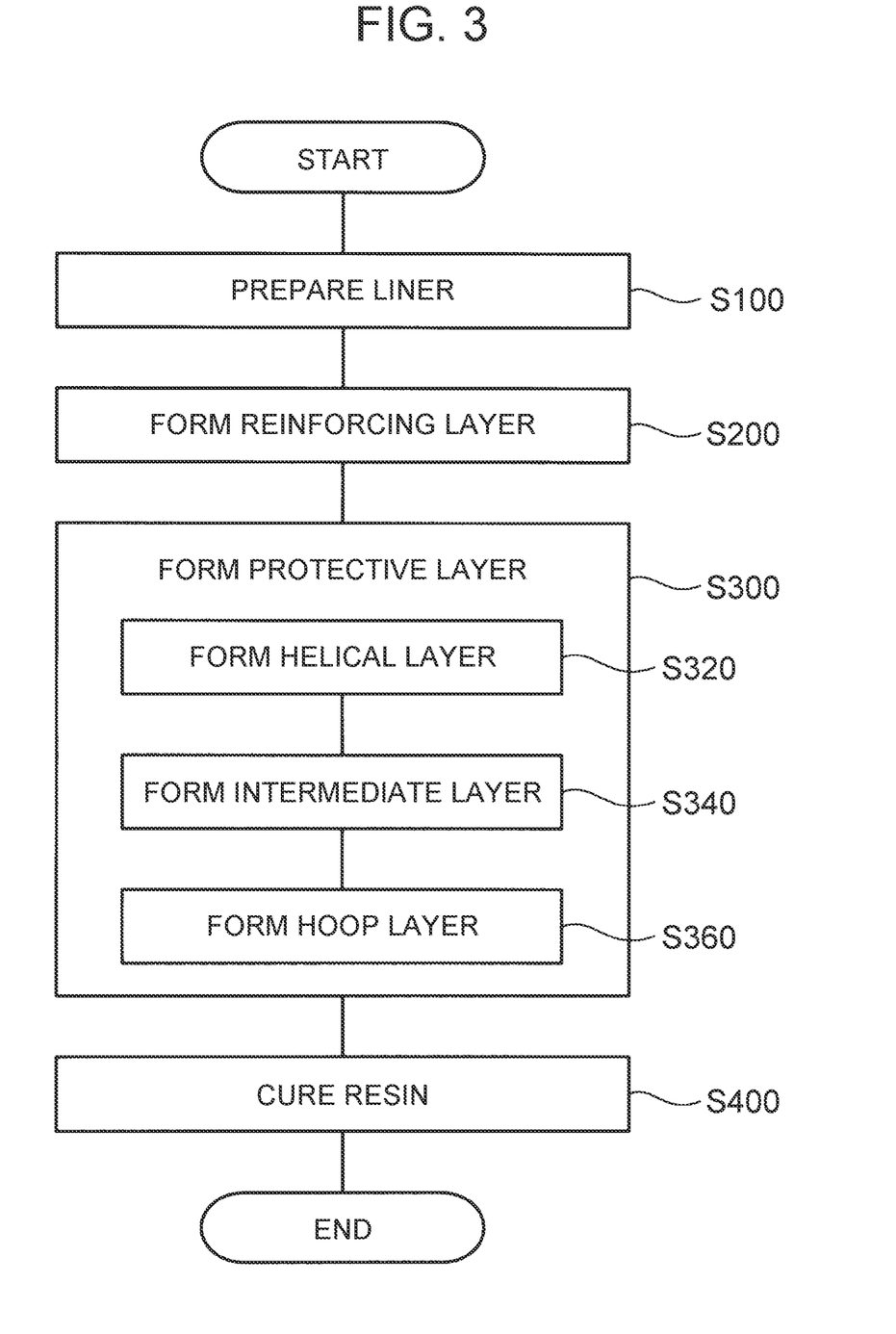
FIG. 3 is a flowchart showing a manufacturing method of a high-pressure tank 100.

FIG. 3 is a flowchart showing a manufacturing method of the high-pressure tank 100. In step S100, the liner 10 is prepared. In step S200, the reinforcing layer 20 is formed on the liner 10. More specifically, carbon fibers impregnated with the epoxy resin Re1 are wound around the liner 10 by a filament winding device to form the reinforcing layer 20. At the stage of step S200, the epoxy resin Re1 contained in the reinforcing layer 20 has not yet been cured.

In step S300, the protective layer 25 is formed on the reinforcing layer 20. Step S300 includes steps S320, S340, S360.

In step S320, the helical layer 252 is formed on the tank main body on which the reinforcing layer 20 has been formed. More specifically, the glass fibers F1 impregnated with the epoxy resin Re1 are wound on the reinforcing layer 20 in a helical pattern by the filament winding device. In this case, the glass fibers F1 are wound on the cylindrical part 102 and the domed parts 104 of the tank main body (see FIG. 1). As a result, the helical layer 252 is formed on the cylindrical part 102 and the domed parts 104 of the tank main body. At the stage of step S320, the epoxy resin Re1 contained in the helical layer 252 has not yet been cured.

Figure 4:
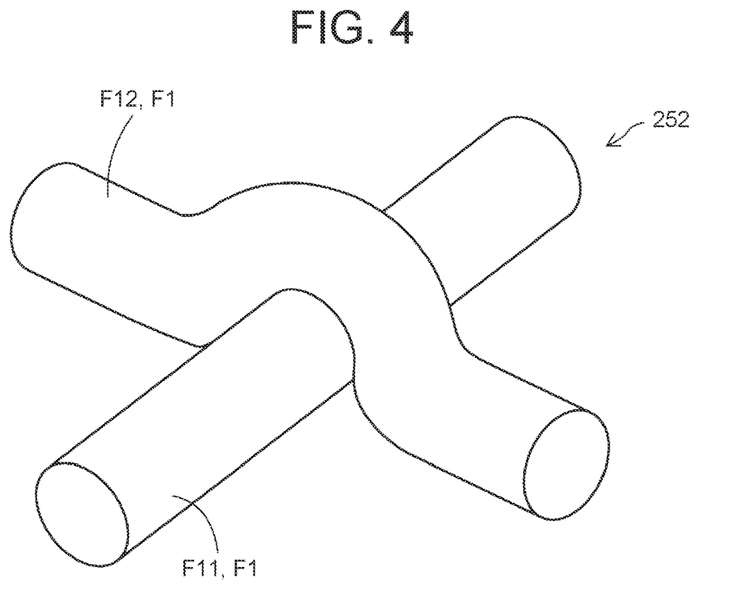
FIG. 4 is a view illustrating a state of glass fibers F1 of a helical layer 252 wound around a tank main body in step S320 of FIG. 3.

FIG. 4 is a view illustrating a state of the glass fibers F1 of the helical layer 252 wound around the tank main body in step S320 of FIG. 3. FIG. 4 is a view for illustrating the gist of the technology and does not show the exact dimensions of each part. In reality, the helical layer 252 is formed on a curved surface. However, to help understand the technology, FIG. 4 shows the state of the glass fibers F1 as if the helical layer 252 were formed on a flat surface. The same applies to FIG. 5 and FIG. 6.

The glass fibers F1 of the helical layer 252 are wound in a direction intersecting a plane perpendicular to the central axis CA (see FIG. 1) of the tank main body. Since the tank main body is not a spherical body, when one glass fiber F1 is wound in such a winding manner and passes through the same point on the tank main body again, the glass fiber F1 is arranged on the tank main body in a direction different from the last time. In FIG. 4, of the glass fibers F1 thus wound in a helical pattern, a portion that has been arranged earlier is represented by a fiber portion F11 and a portion that has been arranged later is represented by a fiber portion F12.

In step S340 of FIG. 3, the intermediate layer 256 is formed on the helical layer 252 located at the cylindrical part 102. More specifically, a single piece of the rectangular glass fiber sheet F3 in which the glass fibers F31, F32 are arranged in the first direction D1 (see FIG. 5) and the second direction D2 (see FIG. 5) different from the first direction D1 is prepared. The length of one side of the glass fiber sheet F3 is substantially equal to the length of the cylindrical part 102 (see FIG. 1) along the central axis CA. The length of another side of the glass fiber sheet F3 is substantially equal to the circumferential length of the cylindrical part 102 in which the helical layer 252 is formed. The glass fiber sheet F3 is impregnated with the epoxy resin Re3, and then the glass fiber sheet F3 is wound on the helical layer 252 corresponding to the cylindrical part 102 so as to cover the helical layer 252. As a result, the intermediate layer 256 is formed on the cylindrical part 102 of the tank main body. At the stage of step S340, the epoxy resin Re3 contained in the intermediate layer 256 has not yet been cured.

This aspect allows the glass fibers F31, F32 of the intermediate layer 256 to be arranged in a shorter time than an aspect of arranging the glass fibers of the intermediate layer 256 by winding these fibers. The high impact resistance of the protective layer 25 is mainly realized by the glass fibers F1, F2 of the helical layer 252 and the hoop layer 254. Therefore, the impact resistance of the protective layer 25 is secured even when the glass fibers F31, F32 of the intermediate layer 256 are arranged by winding the glass fiber sheet F3.

Figure 5:
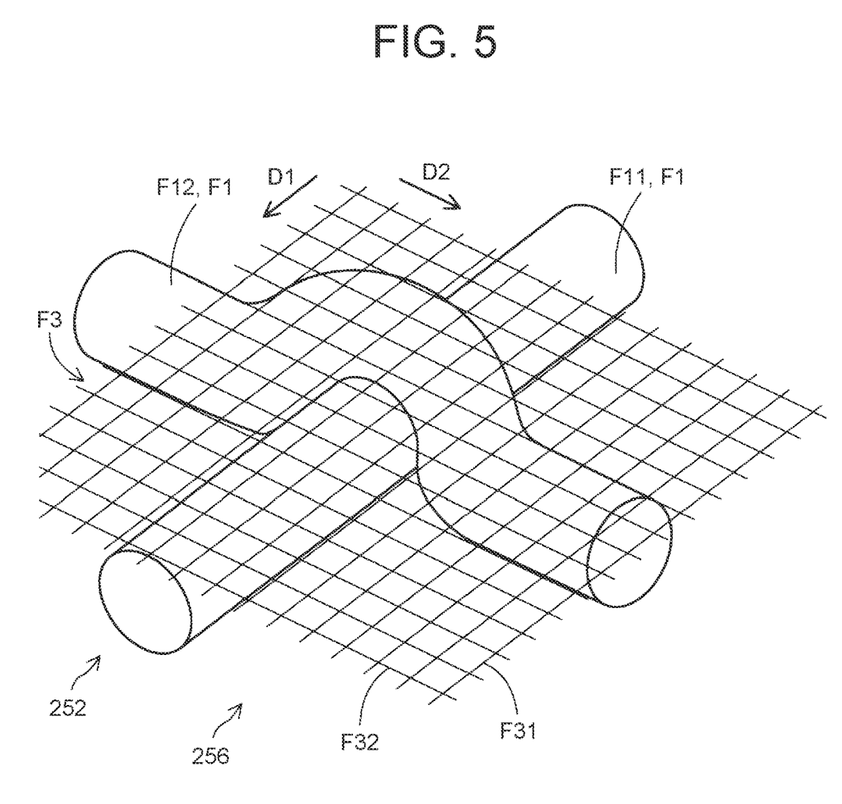
FIG. 5 is a view illustrating a state of glass fibers F31, F32 of an intermediate layer 256 arranged on the helical layer 252 in step S340 of FIG. 3.

FIG. 5 is a view illustrating a state of the glass fibers F31, F32 of the intermediate layer 256 arranged on the helical layer 252 in step S340 of FIG. 3. FIG. 5 is a view for illustrating the gist of the technology and does not show the exact dimensions of each part. Glass fibers arranged along the first direction D1 are denoted by F31. Glass fibers arranged along the second direction D2 are denoted by F32. The glass fibers F31 and the glass fibers F32 form the non-woven fabric sheet F3 in advance.

In step S360 of FIG. 3, the hoop layer 254 is formed on the intermediate layer 256 located at the cylindrical part 102. More specifically, the glass fibers F2 impregnated with the epoxy resin Re2 are wound on the intermediate layer 256 in a hoop pattern by the filament winding device. As a result, the hoop layer 254 is formed on the cylindrical part 102 of the tank main body. At the stage of step S360, the epoxy resin Re2 contained in the hoop layer 254 has not yet been cured.

Figure 6:
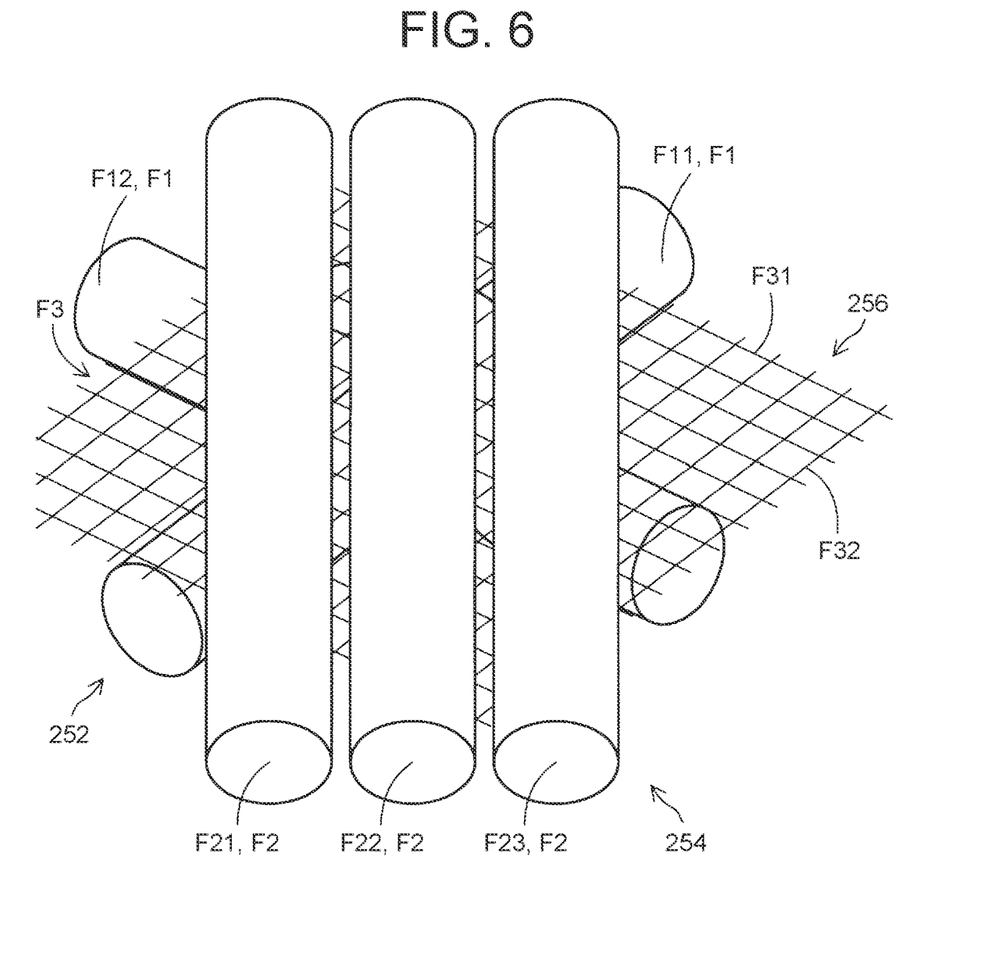
FIG. 6 is a view illustrating a state of glass fibers F2 of a hoop layer 254 wound on the intermediate layer 256 in step S360 of FIG. 3.

FIG. 6 is a view illustrating a state of the glass fibers F2 of the hoop layer 254 wound on the intermediate layer 256 in step S360 of FIG. 3. FIG. 6 is a view for illustrating the gist of the technology and does not show the exact dimensions of each part. The glass fibers F2 of the hoop layer 254 are wound in a direction substantially parallel to a plane perpendicular to the central axis CA of the tank main body (see FIG. 1). To wind the glass fibers F2 so as to cover the cylindrical part 102 of the tank main body, the glass fibers F2 are wound on the intermediate layer 256 while the position of the glass fiber F2 being wound is gradually shifted along the direction of the central axis CA. In FIG. 6, different fiber portions of the glass fibers F2 thus wound in a hoop pattern are denoted by F21, F22, F23.

In step S400 of FIG. 3, the epoxy resins contained in the reinforcing layer 20 and the protective layer 25 are heated, and thereby these epoxy resins contained in the reinforcing layer 20 and the protective layer 25 are cured. As a result, the glass fibers F1 of the helical layer 252 are fixed to one another by the epoxy resin Re1. The glass fibers F2 of the hoop layer 254 are fixed to one another by the epoxy resin Re2. The glass fibers F31, F32 of the intermediate layer 256 are fixed to each other by the epoxy resin Re3. Moreover, the glass fibers F1 in the outermost layer of the helical layer 252 and the glass fibers F2 in the innermost layer of the hoop layer 254 are fixed to the glass fibers F31, F32 of the intermediate layer 256 by the epoxy resin Re3.

The high-pressure tank 100 is manufactured by the process as has been described above.

Figure 7:
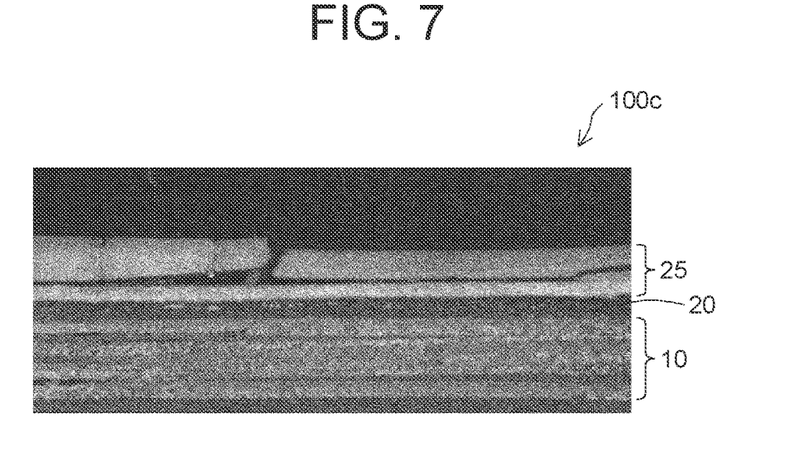
FIG. 7 is a photograph showing a result of repeated gas filling and emptying of a high-pressure tank 100c of a comparative form of implementation that does not have the intermediate layer 256 in a high-temperature, high-humidity environment.

FIG. 7 is a photograph showing a result of repeated gas filling and emptying of a high-pressure tank 100c of a comparative form of implementation that does not have the intermediate layer 256 in a high-temperature, high-humidity environment. FIG. 7 shows a section of the high-pressure tank 100c of the comparative form of implementation in a plane including a central axis (see FIG. 1) of the high-pressure tank 100c of the comparative form of implementation. The configuration of the high-pressure tank 100c of the comparative form of implementation is the same as the configuration of the high-pressure tank 100 of the embodiment except that the former does not have the intermediate layer 256 (see FIG. 2 and FIG. 6). It can be seen from FIG. 7 that repeated gas filling and emptying in a high-temperature, high-humidity environment results in peeling off and turning up of the protective layer 25. Such peeling off has occurred in the cylindrical part 102 of the high-pressure tank 100c but not in the domed parts 104 thereof.

Figure 8:
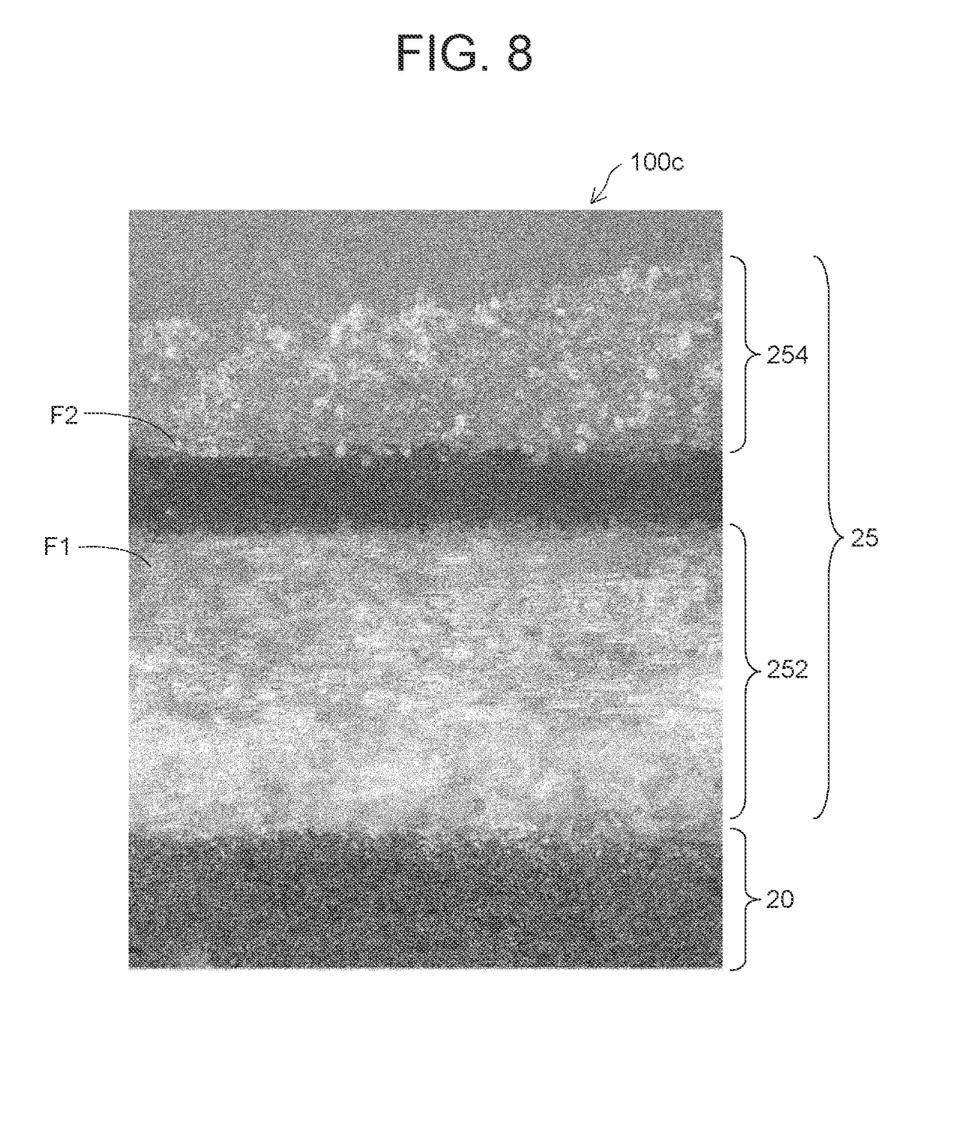
FIG. 8 is an enlarged view showing a part of a reinforcing layer 20 and the protective layer 25 in the structure shown in FIG. 7.

FIG. 8 is an enlarged view showing a part of the reinforcing layer 20 and the protective layer 25 of the structure shown in FIG. 7. In FIG. 8, the hoop layer 254 in which glass fibers are wound in a hoop pattern exhibits sections of the glass fibers having shapes of near-perfect circles (see also FIG. 6). The helical layer 252 in which glass fibers are wound in a helical pattern exhibits sections of the glass fibers having shapes elongated in a lateral direction. It can be seen from FIG. 8 that peeling off has occurred between the helical layer 252 and the hoop layer 254 of the protective layer 25.

Figure 9:
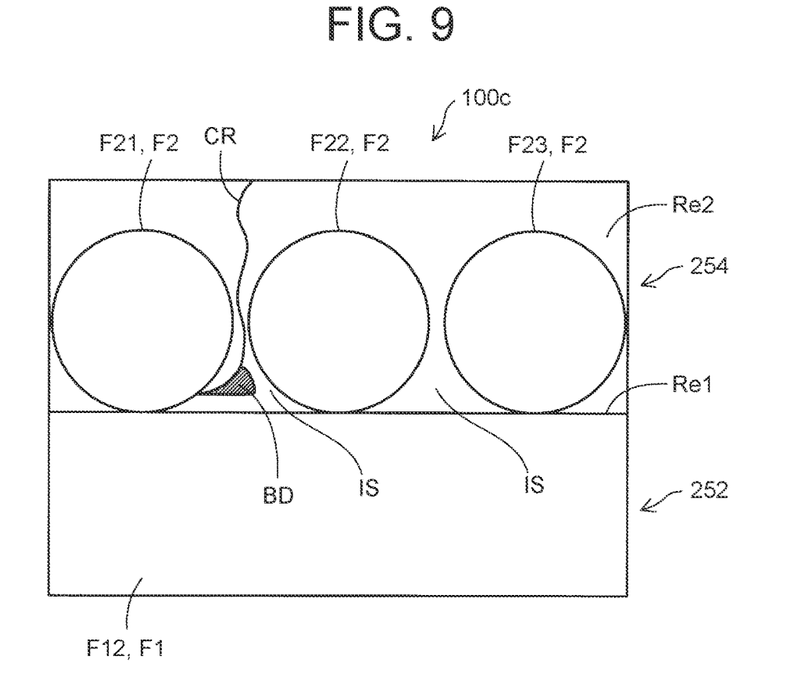
FIG. 9 is a view illustrating how peeling off occurs between the helical layer 252 and the hoop layer 254 in the high-pressure tank 100c of the comparative form of implementation.

FIG. 9 is a view illustrating how peeling off occurs between the helical layer 252 and the hoop layer 254 in the high-pressure tank 100c of the comparative form of implementation. FIG. 9 shows a section of the high-pressure tank 100c of the comparative form of implementation in a plane including the central axis (see FIG. 1) of the high-pressure tank 100c of the comparative form of implementation. As also shown in FIG. 6, in the hoop layer 254, the portions F21, F22, F23 of the glass fibers F2 are arranged substantially parallel to one another, while in the helical layer 252, the portions F11, F12 of the glass fibers F1 are arranged in various directions. For this reason, in the high-pressure tank 100c in which the hoop layer 254 is arranged on the helical layer 252 without the intermediate layer 256 interposed therebetween, there is a wide interval between contact points of the glass fibers F1 in the outermost layer of the helical layer 252 and the glass fibers F2 in the innermost layer of the hoop layer 254, and thus there is a large clearance IS between the glass fibers F1 of the helical layer 252 and the glass fibers F2 of the hoop layer 254. Since the glass fibers F2 of the hoop layer 254 are arranged substantially parallel to one another (see also FIG. 6), the clearance IS shown in FIG. 9 exists continuously along an outer circumferential direction of the cylindrical part 102 in the high-pressure tank 100c of the comparative form of implementation. The clearance IS between the glass fibers F1 of the helical layer 252 and the glass fibers F2 of the hoop layer 254 is filled with the epoxy resin Re1 or the epoxy resin Re2.

Stress applied to the protective layer 25 at a point between the glass fibers F1 forming the outermost layer of the helical layer 252 and the glass fibers F2 forming the innermost layer of the hoop layer 254 is borne by the epoxy resins Re1, Re2 that fill the clearance IS and fix these fibers. The fracture strength of the epoxy resin is significantly lower than that of the glass fibers. The epoxy resin swells in a high-temperature, high-humidity environment. When masses of epoxy resins Re1, Re2 have large volumes, a large difference in dimension between the glass fibers F2, F3 and the epoxy resins Re1, Re2 occurs due to swelling of the epoxy resins Re1, Re2, so that the epoxy resins Re1, Re2 easily peel off from the glass fibers F2, F3. Thus, repeated gas filling and emptying in a high-temperature, high-humidity environment is likely to result in formation of cracks between the glass fibers F1 of the helical layer 252 and the glass fibers F2 of the hoop layer 254, inside portions composed of the epoxy resins Re1, Re2 or at interfaces between the epoxy resins Re1, Re2 and the glass fibers F1, F2.

When there is a large clearance IS between the glass fibers F1 of the helical layer 252 and the glass fibers F2 of the hoop layer 254, a void BD that is not filled with the epoxy resins Re1, Re2 is likely to form. A crack CR is likely to develop from such a void BD as a result of repeated gas filling and emptying.

No peeling off has occurred between the reinforcing layer 20 and the innermost layer of the helical layer 252 in the high-pressure tank 100c of the comparative form of implementation (see FIG. 8). The epoxy resin of the reinforcing layer 20, the epoxy resin Re1 of the helical layer 252, and the epoxy resin Re2 of the hoop layer 254 are resins of the same composition. On the other hand, the diameter of the carbon fibers in the reinforcing layer 20 is smaller than the diameters of the glass fibers F1, F2 in the helical layer 252 and the hoop layer 254. It seems that, because of the smaller diameter of the carbon fibers in the reinforcing layer 20, the above-described problem attributable to the large clearance IS between the helical layer 252 and the hoop layer 254 has not arisen, and therefore no peeling off has occurred, between the reinforcing layer 20 and the helical layer 252.

Figure 10:
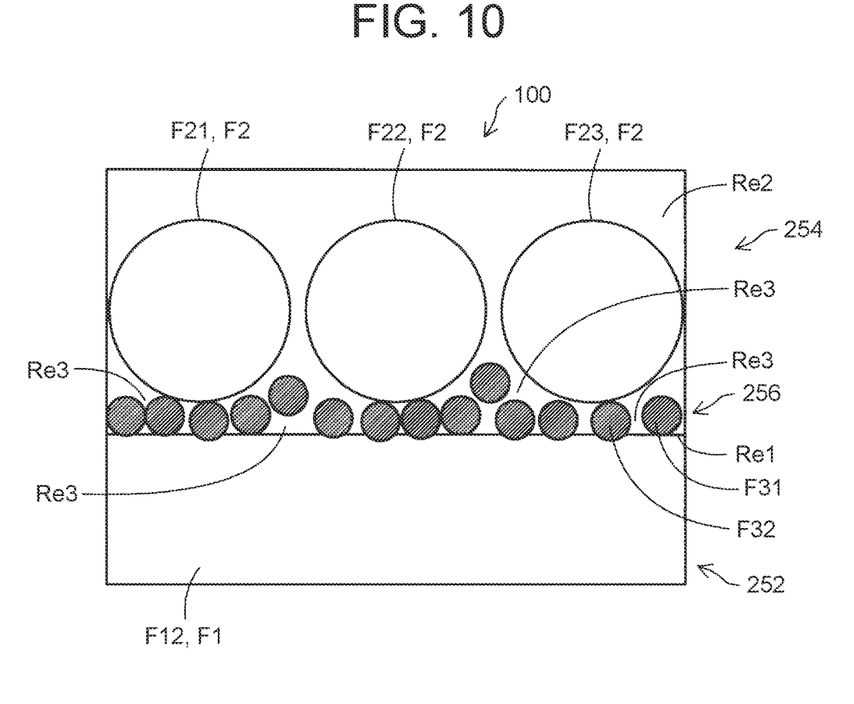
FIG. 10 is a view illustrating how the occurrence of peeling off between the helical layer 252 and the hoop layer 254 is reduced in the high-pressure tank 100 of the embodiment.

FIG. 10 is a view illustrating how the occurrence of peeling off between the helical layer 252 and the hoop layer 254 is reduced in the high-pressure tank 100 of the embodiment. FIG. 10 shows a section of the high-pressure tank 100 of the embodiment in a plane including the central axis CA (see FIG. 1) of the high-pressure tank 100 of the embodiment. As also shown in FIG. 6, in this embodiment, the glass fibers F31, F32 thinner than the glass fibers F2 of the hoop layer 254 and the glass fibers F1 of the helical layer 252 are arranged between the portions F21, F22, F23 of the glass fibers F2 and the portions F11, F12 of the glass fibers F1. Thus, the interval between contact points of the glass fibers F1 of the helical layer 252 and the glass fibers F31, F32 of the intermediate layer 256, and the interval between contact points of the glass fibers F31, F32 of the intermediate layer 256 and the glass fibers F2 of the hoop layer 254, are narrower than the interval between the contact points in the high-pressure tank 100c of the comparative form of implementation. In other words, the clearance among the glass fibers F1, F2, F31, F32 is smaller than the clearance between the glass fibers F1, F2 in the high-pressure tank 100c of the comparative form of implementation. Thus, the constituent part at which the stress applied to the protective layer 25 is borne by the epoxy resin Re3 is reduced and a void from which a crack can develop is less likely to form. Therefore, the formation of cracks in the epoxy resin Re3 that fills such a clearance and fixes the glass fibers F1 forming the outermost layer of the helical layer 252 and the glass fibers F2 forming the innermost layer of the hoop layer 254 is reduced. As a result, the likelihood of the hoop layer 254 peeling off from the helical layer 252 is lessened compared with that in the high-pressure tank 100c of the comparative form of implementation.

In this embodiment, the glass fibers F31, F32 of the intermediate layer 256 are arranged in the first direction D1 and the second direction D2 different from the first direction D1 so as to form the sheet F3 (see FIG. 6). Thus, the clearance between the outermost layer of the helical layer 252 in which the glass fibers F1 are arranged in various directions and the glass fibers F2 of the innermost layer of the hoop layer 254 can be reduced, regardless of the direction of the glass fibers F1 in the outermost layer of the helical layer 252.

In this embodiment, the glass fibers F31, F32 of the intermediate layer 256 form the single piece of sheet F3 that is arranged so as to surround the cylindrical part 102 of the liner 10 in which the reinforcing layer 20 and the helical layer 252 are formed (see S340 of FIG. 3 and FIG. 5). Thus, the hoop layer 254 and the helical layer 252 can be evenly joined together around the cylindrical part 102.

The following method is also conceivable as a method of arranging a structure having a smaller size than the glass fibers F1 contained in the outermost layer of the helical layer 252 and the glass fibers F2 contained in the innermost layer of the hoop layer 254, so as to narrow the interval between contact points of the glass fibers F1, F2 and that additional structure and thereby reduce the clearance: Applying a thermosetting resin, containing particles with a diameter smaller than the diameters of the glass fibers F1, F2, to an upper side of the helical layer 252 and providing the hoop layer 254 on top of this thermosetting resin can theoretically narrow the interval between the contact points of the structures. However, this aspect encounters difficulty in retaining the resin containing particles over the entire helical layer 252 of the cylindrical part 102 in an environment subjected to the force of gravity. That is, the resin containing particles drips from the surface of the helical layer 252 of the cylindrical part 102 under the force of gravity.

Instead, in this embodiment, the glass fiber sheet F3 impregnated with the resin is wound on the helical layer 252 of the cylindrical part 102. Thus, the glass fibers F31, F32 as structures having a smaller size than the glass fibers F1, F2, and the thermosetting resin for fixing the glass fibers F1, F2, F31, F32, can be easily arranged on the helical layer 252 of the cylindrical part 102. Therefore, the intermediate layer 256 can be easily formed.

The glass fibers F1 of the helical layer 252 in this embodiment are also referred to as "first fibers." The epoxy resin Re1 of the helical layer 252 is also referred to as a "first resin." The glass fibers F2 of the hoop layer 254 are also referred to as "second fibers." The epoxy resin Re2 of the hoop layer 254 is also referred to as a "second resin." The glass fibers F31, F32 of the intermediate layer 256 are also referred to as "third fibers." The epoxy resin Re3 of the intermediate layer 256 is also referred to as a "third resin." The tank main body that is the liner 10 with the plug 30 and the plug 40 mounted thereon is also referred to as a "semi-finished product of a high-pressure tank."

B. Other Embodiments

B1. Another Embodiment 1

In the above embodiment, the liner 10 is composed of a nylon resin. However, another synthetic resin having a gas barrier property, such as a polyethylene-based resin, or metal, such as stainless steel, may also be used to produce the liner.

In the above embodiment, the diameter of the glass fibers F1 in the helical layer 252 has a constant value within a range of 10 µm to 20 µm. The diameter of the glass fibers F2 in the hoop layer 254 has a constant value within a range of 10 µm to 20 µm. More specifically, the diameter of the glass fibers F2 in the hoop layer 254 is equal to the diameter of the glass fibers F1 in the helical layer 252. The diameter of the glass fibers F31, F32 in the intermediate layer 256 has a constant value within a range of 2 µm to 10 µm.

However, the diameter of the fibers in the helical layer may have a value smaller than 10 µm, such as 5 µm or 8 µm. The diameter of the fibers in the helical layer may have a value larger than 20 µm, such as 25 µm or 38 µm. The diameter of the fibers in the hoop layer may have a value smaller than 10 µm, such as 5 µm or 8 µm. The diameter of the fibers in the hoop layer may have a value larger than 20 µm, such as 25 µm or 38 µm. The diameter of the fibers in the intermediate layer may have a value smaller than 2 µm, such as 0.5 µm or 1 µm. The diameter of the fibers in the intermediate layer may have a value larger than 10 µm, such as 12 µm or 15 µm. In short, the diameters of the fibers contained in the respective layers may have other values. The fibers contained in the helical layer and the fibers contained in the hoop layer may be different in thickness from each other.

The fibers contained in the intermediate layer may have any diameter that is smaller than the diameter of either the fibers contained in the helical layer or the fibers contained in the hoop layer. The diameter of the fibers contained in the intermediate layer is preferably not larger than half, more preferably not larger than a third, and even more preferably not larger than a fifth, of a smaller one of the diameter of the fibers of the helical layer and the diameter of the fibers of the hoop layer. The fibers contained in the intermediate layer may include fibers that are thicker than either the fibers contained in the helical layer or the fibers contained in the hoop layer.

In the above embodiment, the glass fibers F1, F2, F31, F32 are used as the fibers contained in the helical layer 252, the fibers contained in the hoop layer 254, and the fibers contained in the intermediate layer 256. However, other fibers different in material or composition, such as carbon fibers, can also be used as the fibers contained in the helical layer, the fibers contained in the hoop layer, and the fibers contained in the intermediate layer. However, it is preferable that the fibers contained in each layer can withstand temperatures of 200° C. to 300° C. Moreover, it is preferable that the fibers contained in each layer be flexible and easy to stretch. The helical layer, the hoop layer, and the intermediate layer may contain different fibers, or two or all three of these layers may contain the same fibers.

In the above embodiment, the epoxy resin is used as the resin contained in the helical layer 252, the resin contained in the hoop layer 254, and the resin contained in the intermediate layer 256. However, another thermosetting resin, such as an unsaturated polyester resin, can also be used as the resin contained in the helical layer, the resin contained in the hoop layer, and the resin contained in the intermediate layer. The helical layer, the hoop layer, and the intermediate layer may contain different resins, or two or all three of these layers may contain the same resin.

However, it is preferable that the combination of the fiber material and the resin material used in each layer be such that a contact angle of the resin used relative to the fibers used is not larger than 50° in each layer. The contact angle of the fiber material is measured by the following procedure: The fibers are arranged parallel to one another without a clearance and fixed on a glass plate, and then the resin is dripped onto these fibers. The contact angle is an angle of contact measured 60 seconds after dripping of the resin, as seen from a direction perpendicular to a longitudinal direction of the fibers.

In the above embodiment, neither of the first direction D1 of the glass fibers F31 and the second direction D2 of the glass fibers F32 in the intermediate layer 256 is parallel to the direction of the glass fibers F2 contained in the hoop layer 254. However, the direction of at least some fibers in the intermediate layer may coincide with the direction of the fibers of the hoop layer.

In the above embodiment, the high-pressure tank 100 is to be filled with compressed hydrogen and installed in a fuel cell vehicle. However, the high-pressure tank may be installed in another vehicle, such as an electric vehicle or a hybrid vehicle, or may be installed in another movable object, such as a ship, an airplane, or a robot. Alternatively, the high-pressure tank may be installed in a stationary facility, such as a residential house or a building. The high-pressure tank may be filled with a gas other than hydrogen, such as nitrogen or helium.

B2. Another Embodiment 2

In the above embodiment, the glass fibers F31, F32 in the intermediate layer 256 are arranged in the first direction D1 and the second direction D2 different from the first direction D1 so as to form the non-woven fabric sheet F3 (see FIG. 5 and FIG. 6). However, the directions of the fibers contained in the intermediate layer may be parallel to each other, and the sheet may be a non-woven fabric in which parallel fibers are fixed to one another with an adhesive.

In the above embodiment, the glass fibers F31, F32 in the intermediate layer 256 are arranged in the first direction D1 and the second direction D2 different from the first direction D1 so as to form the non-woven fabric sheet F3 (see FIG. 5). However, the fibers of the intermediate layer may form a sheet that is a woven fabric formed by weaving the fibers together. It is preferable that the fibers of the intermediate layer be arranged such that a plurality of fibers forms a surface.

In the above embodiment, to form the intermediate layer 256, the glass fiber sheet F3 is impregnated with the epoxy resin Re3 and then the glass fiber sheet F3 is wound on the helical layer 252 corresponding to the cylindrical part 102 so as to cover the helical layer 252 (see S340 of FIG. 3 and FIG. 5). However, an aspect of the intermediate layer in which the fibers are not impregnated with the resin can also be adopted.

B3. Another Embodiment 3

In the above embodiment, the glass fibers F31, F32 of the intermediate layer 256 form the single piece of sheet F3 that is arranged so as to surround the cylindrical part 102 of the liner 10 in which the reinforcing layer 20 and the helical layer 252 are formed (see S340 of FIG. 3 and FIG. 5). However, more than one sheet, for example, two, three, or five sheets of the third fibers may be used to form the intermediate layer.

The present disclosure is not limited to the above embodiments but can be realized in various configurations within the scope of the gist of the disclosure. For example, to partially or entirely solve the above-described problem, or to achieve some or all of the above-described effects, the technical features described in the embodiments corresponding to the technical features described in the form of implementation in SUMMARY can be substituted or combined with one another as appropriate. Unless described as being essential in the present specification, technical features can be omitted as appropriate.

What is claimed is:

1. A high-pressure tank comprising:
   a helical layer containing first fibers that are wound in a helical pattern and a first resin that fixes the first fibers;
   a hoop layer located outward of the helical layer in the high-pressure tank and containing second fibers that are wound in a hoop pattern and a second resin that fixes the second fibers; and
   an intermediate layer located between the helical layer and the hoop layer and containing third fibers that are thinner than at least either the first fibers or the second fibers and a third resin that fixes the third fibers, the first fibers of the helical layer, and the second fibers of the hoop layer.

2. The high-pressure tank according to claim 1, wherein:
   the first fibers are impregnated with the first resin, and the first resin fixes different fiber portions of the first fibers to each other; and
   the second fibers are impregnated with the second resin, and the second resin fixes different fiber portions of the second fibers to each other.

3. The high-pressure tank according to claim 1, wherein the third fibers are impregnated with the third resin, and are arranged in a first direction and a second direction different from the first direction so as to form a sheet.

4. The high-pressure tank according to claim 3, further comprising a liner having a cylindrical part and domed parts arranged one at each end of the cylindrical part, with the helical layer being formed so as to surround the liner, wherein the third fibers form a single piece of the sheet that is arranged so as to surround the cylindrical part.

5. A manufacturing method of a high-pressure tank, the method comprising:
   forming a helical layer by winding first fibers, impregnated with a first resin, in a helical pattern on a semi-finished product of the high-pressure tank;
   forming an intermediate layer by arranging third fibers, impregnated with a third resin, on the helical layer; and
   forming a hoop layer by winding second fibers, impregnated with a second resin, in a hoop pattern on the intermediate layer,
   wherein the third fibers of the intermediate layer are thinner than at least either the first fibers of the helical layer or the second fibers of the hoop layer.

6. The manufacturing method of the high-pressure tank according to claim 5, wherein forming the intermediate layer includes arranging on the helical layer a sheet in which the third fibers of the intermediate layer are arranged in a first direction and a second direction different from the first direction.

7. The manufacturing method of the high-pressure tank according to claim 6, wherein:
   the semi-finished product includes a liner having a cylindrical part and domed parts arranged one at each end of the cylindrical part; and
   arranging the sheet on the helical layer includes arranging a single piece of the sheet so as to surround the cylindrical part.

* * * * *